United States Patent [19]

Tomono

[11] Patent Number: 5,629,804
[45] Date of Patent: May 13, 1997

[54] DIFFRACTION GRATING

[75] Inventor: Haruo Tomono, Machida, Japan

[73] Assignee: Canon Kabushiki Kaisha, Tokyo, Japan

[21] Appl. No.: 182,562

[22] Filed: Jan. 18, 1994

[30] Foreign Application Priority Data

Jan. 18, 1993 [JP] Japan .................... 5-005971

[51] Int. Cl.$^6$ ............. G02B 5/18; C08L 75/14; C08L 75/16
[52] U.S. Cl. ................. 359/576; 522/96; 522/97
[58] Field of Search ............ 522/96, 97; 359/576

[56] References Cited

U.S. PATENT DOCUMENTS

| | | | |
|---|---|---|---|
| 4,235,654 | 11/1980 | Dohi et al. | 156/99 |
| 4,576,850 | 3/1986 | Martens | 522/97 |
| 5,138,604 | 8/1992 | Umeda et al. | 369/3 |
| 5,175,030 | 12/1992 | Lu et al. | 428/30 |
| 5,296,949 | 3/1994 | Pennace | 359/2 |

FOREIGN PATENT DOCUMENTS 62-258401  11/1987  Japan.

*Primary Examiner*—Susan W. Berman
*Attorney, Agent, or Firm*—Fitzpatrick, Cella, Harper & Scinto

[57] ABSTRACT

A diffraction grating is constituted by a substrate and a resin layer having a repetitive pattern formed on the substrate. The resin layer is characterized by showing a Young's modulus at 100° C. which is at least 2% of that at 20° C. The resin layer may be obtained by curing a photocurable resin composition, including: (A) a polyfunctional urethane-modified polyester (meth)acrylate comprising a polyester oligomer and a plurality of (meth)cryloyl groups bonded to the polyester oligomer via a urethane group, and having a number-average molecular weight of at least 700, (B) a polyfunctional (meth)acrylate having a number-average molecular weight of less than 700, (C) a monofunctional (meth)acrylate, and (D) a photopolymerization initiator.

4 Claims, 2 Drawing Sheets

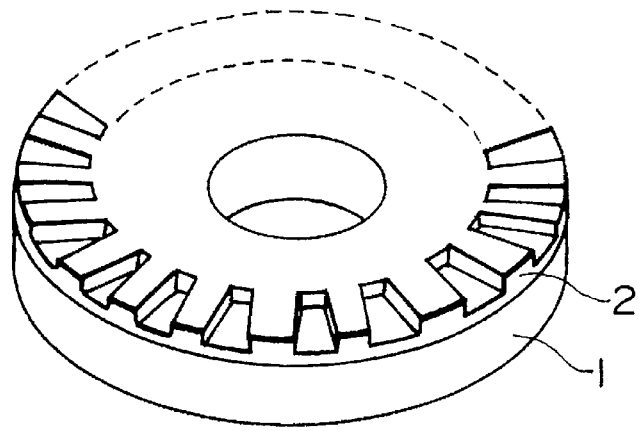
F I G. 1
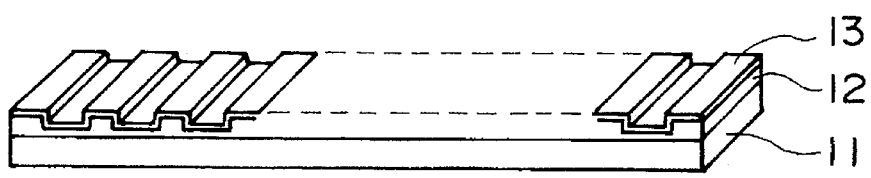
F I G. 2
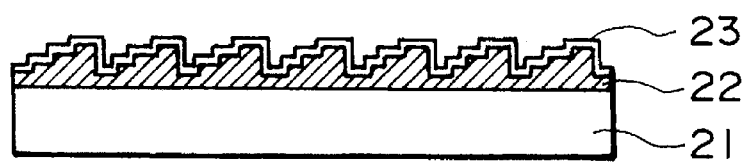
F I G. 3

DIFFRACTION GRATING

FIELD OF THE INVENTION AND RELATED ART

The present invention relates to a diffraction grating for use in, e.g., a scale for optical encoders, a color resolution phase grating, a beam splitter, etc.

Hitherto, there has been known a type of diffraction grating comprising a substrate coated with a resin layer having a repetitive pattern (e.g., U.S. Pat. No. 4,235,654). Such a diffraction grating having a surface resin layer can be easily provided with an arbitrary surface pattern by molding and is therefore advantageous.

Many proposals have been made regarding ultraviolet-curable resin compositions used for providing such coating resin layers. For example, Japanese Laid-Open Patent Application (JP-A) 62-258401 discloses an ultraviolet-curable resin composition comprising a two- to four-functional urethane-modified polyester (meth)acrylate, a tri-functional (meth)acrylate, a mono-functional (meth)acrylate and a photopolymerization initiator, and an optical lens coated with such a resin composition.

The photocurable resin composition disclosed by JP-A 62-258401 provides a cured product showing a generally excellent durability, but there is still desired a diffraction grating which shows a further excellent durability so as to be free from surface scratch, crack or distortion even in a more severe environment.

Further, diffraction gratings are frequently provided with an anti-reflection overcoating layer or a surface reflection layer. In such a case, if there is a distortion in the surface resin layer, the anti-reflection layer or the reflection layer is liable to crack or peel from the resin layer.

SUMMARY OF THE INVENTION

An object of the present invention is to provide a diffraction grating having a surface resin layer showing an excellent durability resistant to surface scratch, crack or distortion.

According to the present invention, there is provided a diffraction grating, comprising: a substrate and a resin layer having a repetitive pattern formed on the substrate, said resin layer showing a Young's modulus at 100° C. which is at least 2% of that at 20° C. Such a resin layer may be formed as a cured product of a photocurable resin composition, comprising:

(A) a polyfunctional urethane-modified polyester (meth)acrylate comprising a polyester oligomer and a plurality of (meth)cryloyl groups bonded to the polyester oligomer via a urethane group, and having a number-average molecular weight of at least 700, (B) a polyfunctional (meth)acrylate having a number-average molecular weight of less than 700, (C) a monofunctional (meth)acrylate, and (D) a photopolymerization initiator.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 2 are respectively a perspective view of an embodiment of the diffraction grating according to the present invention.

FIGS. 3–5 are respectively a sectional view showing an embodiment of the diffraction grating according to the invention.

DETAILED DESCRIPTION OF THE INVENTION

Figure 4:
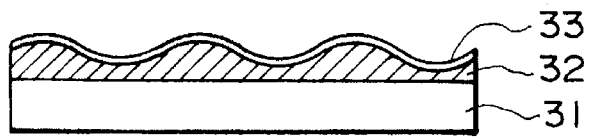

The diffraction grating according to the present invention may comprise a resin layer having an unevenness pattern repeating in a planar direction and formed on a substrate. FIG. 1 shows an embodiment of the diffraction grating used as an optical rotary encoder disk which comprises a circular (disk-shaped) substrate 1 and a resin layer 2 provided with a repetitive unevenness pattern and formed on the substrate 1. The resin layer 2 may be further coated with an anti-reflection layer or a reflection layer. The resin layer 2 is characterized by having a Young's modulus at 100° C. which is at least 2% of the Young's modulus at 20° C. It is desired that the Young's modulus at 100° C. is identical to that at 20° C., but this is impossible. Accordingly, the Young's modulus at 100° C. may preferably be 2–90%, more preferably 10–90%, of that at 20° C.

The Young's moduli referred to herein are based on values measured by using a solid viscoelasticity meter ("RSA-2", available from Rheometrix Co.). More specifically, a resin composition is shaped into a test piece (dumbbell No. 2 according to JIS K7113) and cured with at least 10 Joules/$cm^2$ of ultraviolet rays. The test piece is held by two chucks (span: 23 mm) of the meter and supplied with a tensile strain of 0.1% at a cycle of 3.5 Hz. The temperature raising rate may be 3° C./min.

The substrate 1 may preferably comprise glass but can comprise a resin as the case may be.

The resin layer 2 may preferably be formed by a layer of photocurable resin composition cured on exposure to light or actinic rays, particularly ultraviolet rays. Such a photocurable resin composition preferably used in the present invention comprises:

(A) a polyfunctional urethane-modified polyester (meth)acrylate comprising a polyester oligomer and a plurality of (meth)cryloyl groups bonded to the polyester oligomer via a urethane group, and having a number-average molecular weight of at least 700, (B) a polyfunctional (meth)acrylate having a number-average molecular weight of less than 700, (C) a monofunctional (meth)acrylate, and (D) a photopolymerization initiator.

The polyfunctional urethane-modified polyester (meth)acrylate (A) having a number-average molecular weight of at least 700 comprises as its main chain skeleton a polyester oligomer synthesized from a polybasic acid and a polyhydric alcohol, and may for example be produced by combining one isocyanate group of a diisocyanate with hydroxyl groups at terminal parts of the main chain or side chain(s) of the polyester oligomer and combining a hydroxyl group of a hydroxyl group-containing (meth)acrylate with the other isocyanate group of the diisocyanate. The polyfunctional urethane-modified polyester (meth)acrylate (A) may preferably be two (bi)- to four (tetra)-functional, i.e., have two or four (meth)acryloyl groups. Correspondingly, it is preferred that the polybasic acid and the polyhydric alcohol respectively have two- to four-functional groups.

Preferred examples of the tetra-basic acid may include: tetra-basic acids, such as pyromellitic acid, 2,3,3'-4-biphenyltetracarboxylic acid, benzophenonetetracarboxylic acid and bis(3,4-dicarboxyphenyl)methane, and their anhydrides.

Preferred examples of the tribasic acid may include: inherently tribasic acids, such as trimellitic acid, derived tribasic acids obtained, e.g., by partially esterifying tetrabasic acids, such as pyromellitic acid, 2,3,3',4-biphenyltetracarboxylic acid, benzophenonetetracarboxylic acid and bis(3,4-dicarboxyphenyl)methane, and anhydrides of these tribasic acids.

Preferred examples of the dibasic acid may include: phthalic anhydride, isophthalic acid, terephthalic acid, succinic acid and anhydride thereof, adipic acid, azelaic acid, sebacic acid, tetrahydrophthalic anhydride, hexahydrophthalic anhydride, maleic anhydride, fumaric acid, and itaconic acid.

Preferred examples of the trihydric and tetrahydric alcohols may include: glycerol, trimethylolmethane, trimethylolethane, trimethylolpropane, pentaerythritol monoallyl ether, and pentaerythritol.

Preferred examples of the dihydric alcohol may include: ethylene glycol, propylene glycol, neopentyl glycol, diethylene glycol, dipropylene glycol, hydrogenated bisphenol A, 2,2'-di(4-hydroxypropoxyphenyl)propane, 1,3-butanediol, 1,4-butanediol, 1,5-pentanediol, 1,6-hexanediol, trimethylene glycol, triethylene glycol, and pentaerythritol diallyl ether.

Preferred examples of the diisocyanate may include: tolylene diisocyanate, 4,4'-diphenylmethane diisocyanate, xylylene diisocyanate, hexamethylene diisocyanate, isophorone diisocyanate, lysine diisocyanate, and hydrogenated xylene diisocyanateo Preferred examples of the hydroxyl group-containing (meth)acrylate may include: 2-hydroxyethyl (meth)acrylate, hydroxypropyl (meth)acrylate, polyethylene glycol mono (meth)acrylate, polypropylene glycol mono(meth)acrylate, glycerol mono(meth)acrylate, and glycerol di(meth)acrylate.

As is sometimes used in this field, the term (meth)acrylate is intended to inclusively refer to an acrylate having an acryloyl group and a methacrylate having a methacryloyl group. Similarly, the term (meth)acryloyl group is intended to refer to acryloyl group and methacryloyl group inclusively.

More specifically, the polyfunctional urethane-modified polyester (meth)acrylate (A) may be obtained by subjecting a polyhydric alcohol and a polybasic acid to condensation to obtain a polyester oligomer and subjecting the polyester oligomer to addition of a diisocyanate and then to addition of a (meth)acrylate. Alternatively, it is also possible to react the polyester oligomer with an isocyanate having an unsaturation as represented by the following formula

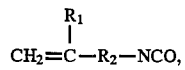

$$CH_2=C-R_2-NCO,$$
with $R_1$ above the C.

wherein $R_1$ denotes hydrogen or a methyl group and $R_2$ denotes —$COOC_nH_{2n}$— (n: an integer of 1–8), so as to have the isocyanate group react with hydroxyl groups at terminal parts of the main chain or side chain(s) of the polyester oligomer, thereby obtaining such a polyfunctional urethane-modified polyester (meth)acrylate (A).

Examples of the isocyanate represented by the above formula may include: isocyanate-methyl (meth)acrylate, isocyanate-ethyl (meth)acrylate, isocyanate-propyl (meth)acrylate, isocyanate-octyl (meth)acrylate, p-methacryloxy-α,α-dimethylbenzyl isocyanurate, and m-acryloxy-α,α-dimethylbenzyl isocyanurate.

The polyester oligomer for constituting the polyester (meth)acrylate (A) may be synthesized by a known condensation reaction under heating at, 150°–250° C. The reaction may appropriately be stopped when the acid value of the system reaches 5 or below, to obtain a desired polyester oligomer having terminal —OH (hydroxyl) groups.

Accordingly, the reaction is performed under the condition that the polyhydric alcohol is is in excess. More specifically, the equivalent ratio of the polybasic acid to the polyhydric alcohol may preferably be in the range of 100:105–300. The resultant polyester oligomer is provided with a higher molecular weight when the ratio approaches 100:105 and a lower molecular weight when the ratio approaches 100:300.

The polyester (meth)acrylate (A) should have a number-average molecular weight of at least 700. If the number-average molecular weight is below 700, the resultant resin composition is liable to considerably shrink on curing and the cured product suffers from a poor shape accuracy. The polyester (meth)acrylate (A) may preferably have a number-average molecular weight of 700–5000, particularly 800–3000.

The number-average molecular weight of the polyester (meth)acrylate (A) may be controlled by the polymerization degree of the polyester oligomer which in turn is determined by the selection of the polybasic acid and the polyhydric alcohol and the ratio therebetween, and also by the selection of the diisocyanate.

The number-average molecular weight value referred to herein is based on values measured as corresponding to those of standard polystyrenes according to the GPC (gel permeation chromatography) by using a commercially available instrument ("M-600", available from Nippon Millipore Ltd.) and a sample solution in THF (tetrahydrofuran) at a concentration of 0.1 wt. %.

Examples of the polyfunctional (meth)acrylate (B) having a number-average molecular weight of below 700 may include: neopentyl glycol hydroxypivarate di(meth)acrylate, 2,2-dimethyl-3-hydroxypropyl-2,2-dimethyl-3-hydroxypropionate di(meth)acrylate, ethylene glycol di(meth)acrylate, polyethylene glycol di(meth)acrylate, propylene glycol di(meth)acrylate, polypropylene glycol di(meth)acrylate, 1,4-butanediol di(meth)acrylate, 1,6-hexanediol di(meth)acrylate, glycerol di(meth)acrylate, neopentyl glycol di(meth)acrylate, neopentyl glycol hydroxypivarate di(meth)acrylate, bisphenol A ethylene oxide-adduct di(meth)acrylate, bisphenol A propylene oxide-adduct di(meth)acrylate, 2,2'-di(hydroxypropoxyphenyl)propane di(meth)acrylate, 2,2'-di(hydroxyethoxyphenyl)propane di(meth)acrylate, tricyclodecanedimethylol di(meth)acrylate, 2,2'-di(glycidyloxyphenyl)propane di(meth)acrylate, trimethylolpropane tri(meth)acrylate, pentaerythritol tri(meth)acrylate, pentaerythritol tetra(meth)acrylate, dipentaerythritol hexa(meth)acrylate, tetramethylolmethane tri(meth)acrylate, tetramethylolmethane tetra(meth)acrylate, tris(2-hydroxyethyl)isocyanurate tri(meth)acrylate, and trimellitic acid tri(meth)acrylate. These examples of the polyfunctional (meth)acrylate (B) may be used singly or in mixture of two or more species. The polyfunctional (meth) acrylate (B) may preferably have two to four functional groups.

If the (meth)acrylate (B) has a number-average molecular weight of 700 or larger, the resultant cured product is liable to have a large thermal distortion. The polyfunctional (meth) acrylate (B) may preferably have a number-average molecular weight of 100–650.

Preferred examples of the monofunctional (meth)acrylate (C) may include: methyl (meth)acrylate, ethyl (meth) acrylate, cyclohexyl (meth)acrylate, dicyclopentyl (meth) acrylate, isophoronyl (meth)acrylate, phoronyl (meth) acrylate, phenyl (meth)acrylate, benzyl (meth)acrylate, α-naphthyl (meth)acrylate, β-naphthyl (meth)acrylate, and dicyclopentenyloxyethyl (meth)acrylate.

Examples of the photopolymerization initiator (D) may include: benzophenone and substitution derivatives thereof, such as hydroxybenzophenone methanesulfonate ester, methyl-O-benzoylbenzoate and p-dimethylaminobenzophenone; benzoic and substitution derivatives thereof, such as benzoic allyl ester, and benzoin alkyl ethers including alkyls, such as methyl, ethyl, isobutyl and isopropyl; acetophenone and substitution derivatives thereof, such as diethoxyacetophenone, 1-hydroxycyclohexyl phenyl ketone, benzyl methyl ketal, 2-hydroxy-2-methylpropiophenone, 1-(4-isopropylphenyl)-2-hydroxy-2-methylpropiophenone, and 1-(4-isopropylphenyl)-2-hydroxy-2-methylpropiophenone; benzil, and oximes, such as 1-phenyl-1,2-propanedione-2-o-benzoyl oxime. These initiators may be used singly or in mixture of two or more species.

The photocurable resin composition used in the present invention may further contain optional additives which may include known polymerization accelerators, polymerization inhibitors, release agents, surface-smoothening agents, and anti-foaming agents.

In the photocurable resin composition used in the present invention, the polyfunctional urethanemodified polyester (meth)acrylate (A) functions to improve the durability against heat, moisture and ultraviolet rays.

The polyfunctional (meth)acrylate (B) is effective in providing a cured product showing an increased hardness and a reduced thermal deformation.

The monofunctional (meth)acrylate (C) is effective in providing the resin composition with an appropriate fluidity or viscosity.

Regarding the contents of the respective components based on the total of the components (A)–(C) as 100 wt. % (the same standard being used herein unless otherwise noted specifically), the content of the component (A) may preferably be 10–90 wt. %, further preferably 25–70 wt. %. Below 10 wt. %, the durability is lowered and, in excess of 90 wt. %, the resin composition is caused to have an excessively high viscosity.

The content of the component (B) may preferably be 30–70 wt. %. Below 30 wt. %, the resultant cured product is liable to have a large thermal deformability. In excess of 70 wt. %, the cured product is liable to be brittle, and a remarkable shrinkage is liable to be caused at the time of curing of the composition.

The component (C) may preferably be 10–90 wt. %, further preferably 25–70 wt. %.

The component (D) may preferably be 0.1–5 wt. %.

In the present invention, it is preferred to provide a cured resin layer showing a Young's modulus ratio (at 100° C./at 20° C.) in the range of 10–90%. In order to accomplish this condition, it is preferred that the photocurable resin composition according to the present invention comprises 25–45 wt. % of the component (A), 31–50 wt. % of the component (S) and 5–44 wt. % of the component (C).

The anti-reflection layer optionally formed on the resin layer 2 may comprise a single layer or plural layers in lamination of materials, such as $SiO_2$, SiO, $MgF_2$, $TiO_2$, $Ti_2O_3$, $Al_2O_3$, $CeO_2$, $La_2O_3$, $Y_2O_3$ and $ZrO_2$. The reflection layer also optionally formed on the resin layer 2 may comprise a single layer or plural layers in lamination of materials, such as Al, Cu, Ag, Au and Cr, for example. Such an anti-reflection layer or a reflection layer may be formed by, e.g., vacuum evaporation, sputtering, or ion plating.

The resin layer 2 may preferably be formed in a thickness in the range of 1.0–300 μm. The anti-reflection layer and reflection layer may preferably be formed in a thickness of 0.05–1.0 μm.

FIGS. 2–5 respectively show another embodiment of the diffraction grating according to the present invention. FIG. 2 shows a diffraction grating for an optical linear encoder scale comprising a rectangular substrate 11 successively coated with a resin layer 12 provided with a repetitive unevenness pattern and an anti-reflection layer.

FIG. 3 shows a diffraction grating comprising a rectangular substrate 21 coated with a resin layer 22 provided with a repetitive stepwise unevenness pattern and an anti-reflection layer 23.

FIG. 4 shows a diffraction grating comprising a rectangular substrate 31 successively coated with a resin layer 32 provided with a repetitive sinusoidal unevenness pattern and an anti-reflection layer 33.

Figure 5:
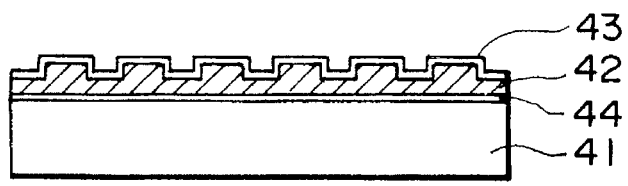

FIG. 5 shows a diffraction grating comprising a rectangular substrate successively coated with a primer layer 44, a resin layer 42 provided with a repetitive unevenness pattern and an anti-reflection layer 43. Such a primer layer 44 may be formed by, e.g., a silane coupling agent so as to strengthen the adhesion between the resin layer 42 and the substrate 41.

FIGS. 2–5 show a transmission-type diffraction grating which is provided with an anti-reflection layer over the resin layer, but the diffraction grating according to the present invention can also be constituted as a reflection-type diffraction grating by disposing a reflection layer in phase of the anti-reflection layer. Alternatively, it is also possible to omit such an anti-reflection layer or a reflection layer.

Figure 6:
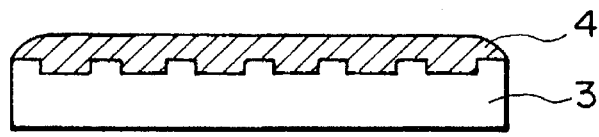
FIGS. 6–8 are schematic sectional views showing steps for producing a diffraction grating according to the invention including a step of forming a layer of photocurable resin composition on a substrate (FIG. 6), a step of photo-irradiating the photocurable resin composition between a mold and a substrate (FIG. 7), and a step of separating the mold from the diffraction grating (FIG. 8).
Figure 7:
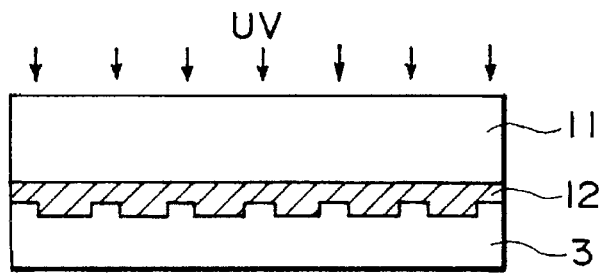
Figure 8:
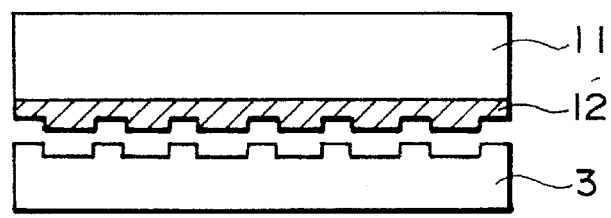

A diffraction grating according to the present invention may be produced, e.g., in a manner as illustrated in FIGS. 6–8. More specifically, as shown in FIG. 6, onto a mold 3 having a repetitive surface unevenness pattern corresponding to the objective diffraction grating pattern, a photocurable resin composition 4 as described above is applied. Then, as shown in FIG. 7, a substrate 11 is pressed onto the mold 3 with a prescribed spacing therefrom to form a resin layer 12, which is then irradiated with ultraviolet rays at a rate of, e.g., at least 10 Joules/$cm^2$ incident through the substrate 11. Finally, as shown in FIG. 8, the substrate 11 coated with a cured resin layer 12 provided with an unevenness pattern is separated from the mold 3 to provide a diffraction grating according to the present invention. Thereafter, the resin layer 12 may be further coated with an anti-reflection layer or a reflection layer as desired.

The mold 3 used for the above purpose may have been provided with the prescribed repetitive unevenness pattern corresponding to a desired diffraction grating pattern by a process, such as mechanical cutting or photolithography, selected as desired depending on the required pattern or size accuracy, and the mold can comprise any of glass, metal and plastics. In the case where the mold 3 is composed of a transparent material, the resin layer can be irradiated for curing with ultraviolet rays incident through the mold.

The photocurable resin composition may be cured on exposure to actinic rays, preferably ultraviolet rays from a light source, such as a chemical lamp, a low-pressure mercury lamp, a high-pressure mercury lamp, a carbon arc lamp, or a xenone lamp.

EXAMPLE

Hereinbelow, the present invention will be described more specifically based on examples.

Production Example (I) of Component (A)

In a four-neck flask equipped with a condenser, an $N_2$ gas-supply pipe, a thermometer and a stirrer, 49 g of phthalic anhydride (polybasic acid) and 114 g propylene glycol (polyhydric alcohol) were placed and stirred under heating in a nitrogen atmosphere. The system was heated to 150° C. and held at that temperature for 2 hours. Thereafter, the system was gradually heated and held at 230° C. to proceed the reaction. The reaction was completed when the acid value reached 5 or below. After cooling to room temperature, 166 g of 1,4-cyclohexylene diisocyanate, 174 g of 2-hydroxyethyl acrylate and 0.11 g of dibutyltin dilaurate were added, and the reaction was continued for 3 hours under moderate heating so that the system temperature did not exceed 80° C. Then, the system was heated to 100° C. within 1 hour, followed by 3 hours of reaction thereat, to obtain a urethane modified polyester acrylate (I) having a number-average molecular weight (Mn) of 860.

Production Example (II)

77 g of trimellitic anhydride (polybasic acid) and 182 g of propylene glycol (polyhydric alcohol) were reacted similarly as in Production Example (I). After cooling to room temperature, 265 g of isophorone diisocyanate, 186 g of 2-hydroxyethyl acrylate and 0.16 g of dibutyltin dilaurate were added, and the reaction was performed under similar conditions as Production Example (I) to prepare a urethane-modified polyester acrylate (II) having a number-average molecular weight of 1500.

Production Example (III)

135 g of tetrahydrophthalic anhydride (polybasic acid) and 40 g of trimethylolpropane and 97 g of 1,3-butylene glycol (polyhydric alcohols) were reacted similarly as in Production Example (I). After cooling to room temperature, 177 g of isophorone diisocyanate, 143 g of 3-hydroxypropyl acrylate and 0.12 g of dibutyltin dilaurate were added, and the reaction was performed under similar conditions as in Production Example (I) to prepare a urethane-modified polyacrylate (III) having a number-average molecular weight of 1400.

Production Example (IV)

1168 g of adipic acid (polybasic acid), 930 g of 1,4-butanediol (polyhydric alcohol) and 0.5 g of p-toluenesulfonic acid (catalyst) were subjected to reaction similarly as in Production Example (I). An excess of the 1,4-butanediol was distilled off under a reduced pressure to complete the reaction. After cooling to room temperature, 398 g of isophorone diisocyanate, 232 g of 2-hydroxyethyl acrylate and 2 g of dibutyltin laurate were added, and the reaction was performed under similar conditions as in Production Example (I).

Production Example (V) (Comparative)

59 g of maleic anhydride (polybasic acid) and 91 g of propylene glycol (polyhydric alcohol) were reacted similarly as in Production Example (I). After cooling to room temperature, 169 g of 2-isocyanate-ethyl acrylate and 0.08 g of dibutyltin laurate were added to the system, and the reaction was thereafter performed similarly as in Production Example (I) to obtain a urethane-modified polyester acrylate (V) having a number-average molecular weight of 510.

The above-prepared acrylates (I)–(V) as Component (A) were blended with Components (B)–(D) shown in Table 1 appearing hereinafter in ratios also shown in Table 1 to prepare 6 photocurable resin compositions (Example 1–5 and Comparative Example 1).

The above-prepared 6 types of photocurable resin compositions were used for preparing optical rotary encoder disks (Examples 1–3) having a structure as shown in FIG. 1 and optical linear encoder scales (Examples 4–5 and Comparative Example 1) having a structure as shown in FIG. 1.

For production of the rotary encoder disks, a white glass plate having an outer diameter of 30 mm and a central perforation in a diameter of 5 mm was used as the substrate. The surface of the white glass plate to be coated with a resin layer was finished to have a surface accuracy corresponding to three Newton's rings. The white glass plate was coated with one of the photocurable resin compositions to form a replica lens, which was then shaped and cured into a diffraction grating pattern as shown in FIG. 1 comprising a plurality of fan-shaped and radially extending grooves in a range of 10 mm from the outer periphery by using a quartz glass mold provided with an unevenness pattern by dry etching. The grooves were formed at a pitch of 3.2 μm and in a width of 1.6 μm, respectively as measured at a position 9.5 mm distant radially from the center of the disk substrate. The grooves were formed in a depth of 0.5 μm, relative to a thickness of the resin layer of 20 μm at the convexities. The cured resin layer provided with the above diffraction grating pattern was further coated with a laminate anti-reflection layer successively including a 300 nm-thick SiO layer, a 250 nm-thick $TiO_2$ layer and a 125 nm-thick $SiO_2$ layer, respectively formed by vacuum evaporation.

Alternatively, for production of linear encoder scales, a rectangular white glass plate in sizes of 20 mm width, 60 mm length and 3 mm thickness, was used as the substrate. The surface of the white glass plate to be coated with a resin layer was finished to a surface accuracy corresponding to three Newton's rings. The white glass plate was coated with one of the above photocurable resin compositions to form a replica lens, which was then shaped and cured into a diffraction grating pattern as shown in FIG. 1 comprising a plurality of grooves by using a dry-etched quartz mold. The grooves were formed at a pitch of 3.2 μm and in a thickness of 0.5 μm relative to a thickness of 20 μm of the resin layer at the convexities. The resin layer thus formed was further coated with a laminate anti-reflection layer identical to the one formed for providing the rotary encoders described above.

In this way, 6 types of diffraction gratings were prepared each in a plurality, and each type of optical lenses were subjected to the following two types of durability tests.

Durability Test (I)

Left standing for 500 hours in a high temperature—high humidity vessel of 70° C. and 85% RH.

Durability Test (II)

Subjected to 20 cycles each including 2 hours of standing at a low temperature of −30° C. and subsequent 2 hours of standing in a high temperature high humidity of 60° C. and 60% RH.

The respective diffraction gratings subjected to either one of the above durability tests (I) and (II) were evaluated with respect to the following items. The results are shown in Table 2.

(1) Appearance

The cured resin layer and the anti-reflection layer were observed with eyes as to whether cracking, corrosion, bubbles, peeling and remarkable color change were present or not. The appearance was judged to be good where no change was observed.

(2) Wear resistance

The surface of the anti-reflection layer was rubbed with a lens-cleaning paper ten times at a load of 300 g, and the appearance thereafter was observed with eyes. The wear resistance was judged to be good where no change was observed.

(3) Solvent resistance

The surface of the anti-reflection layer was rubbed ten times at a load of 300 g with a lens-cleaning paper impregnated with an alcohol-ether type solvent. Thereafter, the appearance was observed, and a sample with no change was judge to be good.

(4) Adhesion

An adhesive tape ("CT-18", available from Nichiban K. K.) was applied to and peeled from the anti-reflection layer three cycles. Thereafter, the appearance of the anti-reflection layer was observed, and a sample with no change was judged to be good.

In addition to the above, each resin composition was shaped into a cured dumbbell test piece to measure a Young's modulus ratio (at 100° C./at 20° C). The results are shown in Table 1.

(5) Change in diffraction efficiency

Each diffraction grating was irradiated with a semiconductor laser beam having a wavelength of 780 nm and a spot diameter of 2 mm and incident perpendicularly to the diffraction grating surface, and the transmitted and diffracted light was received by a photosensor, whereby the diffracted light was electrically measured. More specifically, the rotary encoder disk was scanned along a circle having a radius of 9.5 mm from the center of the disk, and the linear encoder was scanned over the entire length of 60 mm, whereby the variation of the diffracted light intensity in terms of a percentage based on the average of the diffracted light intensity was measured as a diffraction efficiency change.

As is understood from the results of Table 2, the diffraction gratings of Examples 1–5 all showed good results, but the diffraction grating of Comparative Example 1 showed a large change in diffraction efficiency after the durability test so that it was evaluated to be unsuitable as a diffraction grating.

TABLE 1

| | | | Composition (weight parts) | | | | | |
| | | | Example | | | | | Comp. |
| | Component | Mn | 1 | 2 | 3 | 4 | 5 | Ex. 1 |
|---|---|---|---|---|---|---|---|---|
| Urethane-modified polyester acrylate (I) | (A) | 860 | | | | | 20 | |
| Urethane-modified polyester acrylate (II) | (A) | 1500 | | | 22 | 20 | 20 | |
| Urethane-modified polyester acrylate (III) | (A) | 1400 | | 32 | | | | |
| Urethane-modified polyester acrylate (IV) | (A) | 3000 | 25 | | 22 | 20 | | |
| Urethane-modified polyester acrylate (V) | (A) | 510 | | | | | | 50 |
| Trimethylolpropane triacrylate | (B) | 296 | | 20 | | | | |
| Dipentaerythritol hexaacrylate | (B) | 578 | | | | 20 | 20 | 10 |
| Tris(2-acryloxyethyl) isocyanurate | (B) | 423 | 15 | 16 | 31 | 15 | 15 | 15 |
| Trimethylolpropane-propoxy triacrylate | (B) | 470 | 50 | | | | | |
| Cyclohexyl acrylate | (C) | — | 10 | | 25 | 25 | 25 | 25 |
| Dicyclohexyloxyethyl methacrylate | (C) | — | | 32 | | | | |
| 1-Hydroxycyclohexyl phenyl ketone | (D) | — | 2 | 3 | 1 | 1 | 2 | 2 |
| Young's moduls ratio (at 100° C./at 20° C.) (%) | | | 18 | 6.2 | 44 | 22 | 20 | 0.5 |

TABLE 2

| | Evaluation of optical lenses | | | | | |
| | Example | | | | | Comp. |
| | 1 | 2 | 3 | 4 | 5 | Ex. 1 |
|---|---|---|---|---|---|---|
| Durability Test (I) | | | | | | |
| Appearance | good | good | good | good | good | good |
| Wear resistance | good | good | good | good | good | good |
| Solvent resistance | good | good | good | good | good | good |
| Adhesion | good | good | good | good | good | good |
| Diffraction efficiency change (%) | ±5 | ±5 | ±5 | ±5 | ±5 | ±15 |
| Durability Test (II) | | | | | | |
| Appearance | good | good | good | good | good | good |
| Wear resistance | good | good | good | good | good | good |
| Solvent resistance | good | good | good | good | good | good |
| Adhesion | good | good | good | good | good | good |
| Diffraction efficiency change (%) | ±5 | ±5 | ±5 | ±5 | ±5 | ±40 |

What is claimed is:

1. A diffraction grating comprising:
   a substrate and a resin layer having a repetitive pattern formed on the substrate, wherein said resin layer comprises a cured product of a photocurable resin composition comprising:
   (i) 25–45 wt. % of (A) a polyfunctional urethane-modified polyester (meth)acrylate comprising a polyester oligomer and a plurality of (meth)acryloyl groups bonded to the polyester oligomer via a urethane group and having a number-average molecular weight of at least 800,
(ii) 31–70 wt. % of (B) a polyfunctional (meth)acrylate having a number-average molecular weight of less than 650,
(iii) 5–44 wt. % of (C) a monofunctional (meth)acrylate, and
(iv) (D) a photopolymerization initiator.

2. A diffraction grating according to claim 1, further comprising a reflection layer on the resin layer.

3. A diffraction grating according to claim 1, further comprising an anti-reflection layer on the resin layer.

4. A diffraction grating according to claim 1, wherein the resin layer shows a Young's modulus at 100° C. which is 10–90% of that at 20° C.

* * * * *

UNITED STATES PATENT AND TRADEMARK OFFICE
CERTIFICATE OF CORRECTION

PATENT NO. : 5,629,804

DATED : May 13, 1997

INVENTOR(S) : HARUO TOMONO

Page 1 of 2

It is certified that error appears in the above-identified patent and that said Letters Patent is hereby corrected as shown below:

ON TITLE PAGE AT ITEM [57] ABSTRACT
  Line 8, "(meth)cryloyl" --(meth)acrylol--.

COLUMN 1
  Line 50, "(meth)cryloyl" --(meth)acrylol--.

COLUMN 2
  Line 48, "(meth)cryloyl" --(meth)acrylol--.

COLUMN 3
  Line 20, "iraconic" should read --itaconic--;
  Line 36, "diisocyanateo" should read --diisocynate.--

COLUMN 4
  Line 8, "at," should read --at, e.g.,--.

COLUMN 5
  Line 33, "urethanemodified" should read --urethane-modified--.
  Line 65, "(S) should read --(B)--.

COLUMN 7
  Line 4, "EXAMPLE" should read --EXAMPLES--;
  Line 26, "urethane modified" should read --urethane-modified--.

UNITED STATES PATENT AND TRADEMARK OFFICE
CERTIFICATE OF CORRECTION

PATENT NO. : 5,629,804

DATED : May 13, 1997

INVENTOR(S) : HARUO TOMONO

It is certified that error appears in the above-identified patent and that said Letters Patent is hereby corrected as shown below:

COLUMN 9
  Line 7, "temperature high" should read --temperature-high--.
  Line 51, "judge" should read --judged--.

COLUMN 10
  Table 1, "moduls" should read --modulus--.

Signed and Sealed this

Twenty-seventh Day of January, 1998

BRUCE LEHMAN

*Attest:*

*Attesting Officer*     *Commissioner of Patents and Trademarks*